United States Patent
Gerber et al.

(10) Patent No.: US 12,473,702 B2
(45) Date of Patent: Nov. 18, 2025

(54) WAVE BREAK APPARATUS

(71) Applicant: Fred Ross, Kansas City, MO (US)

(72) Inventors: Kyle Gerber, Kansas City, MO (US);
Fred Ross, Jr., Kansas City, MO (US)

(73) Assignee: Fred Ross, Jr., Kansas City, MO (US)

( * ) Notice: Subject to any disclaimer, the term of this patent is extended or adjusted under 35 U.S.C. 154(b) by 143 days.

(21) Appl. No.: 18/440,608

(22) Filed: Feb. 13, 2024

(65) Prior Publication Data
US 2025/0257535 A1 Aug. 14, 2025

(51) Int. Cl.
*E02B 3/06* (2006.01)

(52) U.S. Cl.
CPC .................. *E02B 3/062* (2013.01)

(58) Field of Classification Search
CPC ..... E02B 3/00; E02B 3/02; E02B 3/06; E02B 3/062
See application file for complete search history.

(56) References Cited

U.S. PATENT DOCUMENTS

| | | | |
|---|---|---|---|
| 3,760,754 A | 9/1973 | Drummond | |
| 3,877,233 A | 4/1975 | Olsen | |
| 3,991,576 A | 11/1976 | Tazaki | |
| 4,136,994 A * | 1/1979 | Fuller | F03B 13/188 405/27 |
| 4,154,548 A * | 5/1979 | Ijima | E02B 3/06 405/211 |
| 7,165,912 B2 | 1/2007 | Herzog | |
| 7,524,140 B2 * | 4/2009 | Bishop | F42D 5/045 405/27 |
| 9,422,684 B2 | 8/2016 | Danehower | |
| 2013/0170909 A1 * | 7/2013 | Osby | E02B 7/02 405/26 |
| 2016/0053454 A1 * | 2/2016 | Neelamani | E02B 3/04 405/26 |

FOREIGN PATENT DOCUMENTS

| | | |
|---|---|---|
| CN | 103321180 B | 8/2016 |
| EP | 0452463 A1 | 10/1991 |
| FR | 2410092 A1 | 6/1979 |

OTHER PUBLICATIONS

WaveEater4870, WaveEater Model 4870, Wave Eater, https://waveeater.com/model-4870/, Feb. 28, 2023.
WaveEaterTripleString, Model 3870—3 String, Wave Eater, https://waveeater.com//wp-content/uploads/2023/02/Model-4870-3636-3-string.pdf, Feb. 28, 2023.

* cited by examiner

*Primary Examiner* — Kyle Armstrong
(74) *Attorney, Agent, or Firm* — Lathrop GPM LLP; Robert J. Lambrechts

(57) ABSTRACT

A floating wave break apparatus to dissipate wave action in a body of water, the apparatus including three longitudinally extending wall members each with a plurality of through holes therein. The apparatus also includes a plurality of flotation members disposed between the longitudinally extending wall members. The wave break apparatus also includes at least one restraining member above the at least one flotation member for restraining the flotation member against upward translation as well as an anchor system with at least one winch and rope combination. The winches are mounted to the restraining member and the ropes are adjustable to restrain movement of the wave break apparatus.

28 Claims, 14 Drawing Sheets

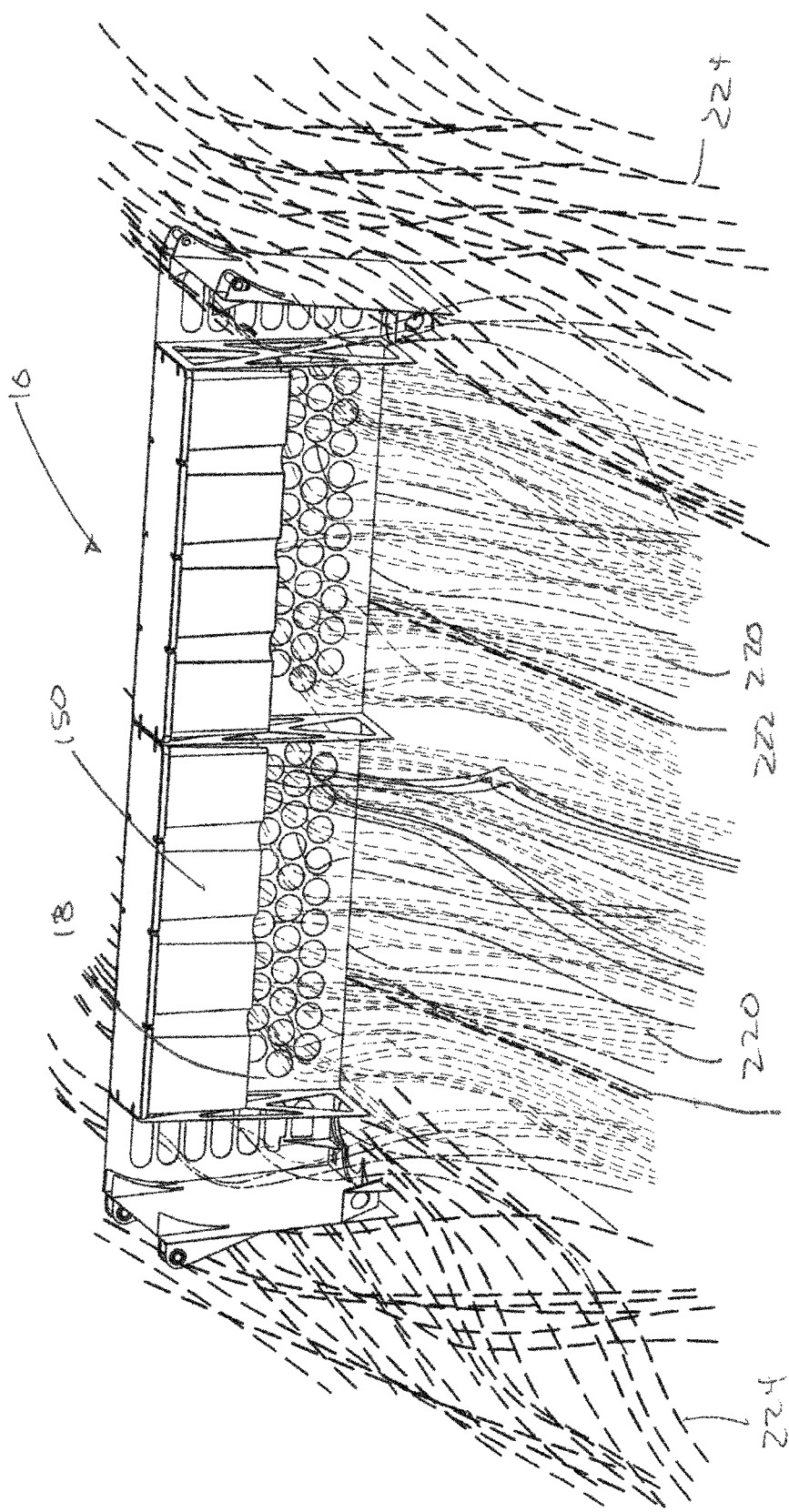

WAVE BREAK APPARATUS

FIELD

This disclosure relates to a floating wave break apparatus to dissipate wave action in a body of water.

BACKGROUND

Shoreline erosion is a natural process that occurs when waves, tides, and currents erode the shore and transport sediment offshore. While erosion is a natural process, human activities such as coastal development and sea level rise have exacerbated the problem, making it a significant environmental and economic issue. Wave breaks are one of the most effective ways to prevent shoreline erosion as well as damage to docks, structures built on piers over water and to protect the coast.

Wave breaks are structures built offshore to dissipate wave energy before the wave reaches the shore. Wave breaks can take various forms, including submerged reefs, offshore wave breaks, and artificial islands. The primary function of a wave break is to reduce wave energy, which in turn reduces the velocity and erosive power of the waves.

A reduction in wave energy can help to prevent beach erosion and protect the coastline from storm surges and tidal flooding. Secondly, wave breaks can create calm water zones that are ideal for swimming, fishing, and other recreational activities. Lastly, wave breaks can provide habitat for marine life, which can help restore ecosystems and enhance biodiversity.

There are several types of wave breaks, each with its advantages and disadvantages. Submerged reefs, for example, are constructed by placing large boulders or concrete structures on the seabed. These structures break the waves before they reach the shore, dissipating their energy and reducing erosion. The disadvantage of submerged reefs is that they can be difficult to construct and maintain, and they may be a hazard to boats and other watercraft.

Offshore wave breaks, on the other hand, are structures built offshore to break waves before they reach the shore. These structures can be made of concrete, rock, or steel, and they are typically submerged to a depth that allows boats to pass over them safely. The advantage of offshore wave breaks is that they are relatively easy to construct and maintain, and they can be effective in reducing wave energy and erosion. However, they can be expensive to build, and they may create navigational hazards for boats and other watercraft.

In conclusion, wave breaks are an effective way to prevent shoreline erosion and protect the coast. They can significantly reduce wave energy, create calm water zones for recreational activities, and provide habitat for marine life. However, the choice of wave break will depend on various factors such as the cost, ease of construction, and environmental impact.

SUMMARY

Disclosed herein is a floating wave break apparatus configured to optimize the dissipation of wave action in a body of water. The configuration of the disclosed apparatus has been optimized to reduce the energy of wave action utilizing a field of study known as computational fluid dynamics. This area of study, henceforth referred to as CFD, has become an essential tool in many fields of engineering and science. Advances in computing technology, software development, and mathematical modeling techniques have helped to improve the accuracy and efficiency of CFD simulations, making it an increasingly valuable tool for solving complex fluid dynamics problems.

CFD is a branch of fluid mechanics that uses numerical analysis and algorithms to analyze and solve problems that involve the behavior of fluids. CFD has become a valuable tool in engineering and scientific research, allowing engineers and scientists to simulate and analyze complex fluid dynamics problems that would be otherwise difficult or impossible to study experimentally.

The basic principles of CFD involve the use of mathematical equations that describe the behavior of fluids, including the Navier-Stokes equations, which govern the motion of fluids, and the continuity equation, which relates the rate of flow to the change in volume over time. These equations are used to create a mathematical model of the fluid flow, which can be solved using computational methods.

CFD is used in a wide range of industries, including aerospace, automotive, civil engineering, energy production, and environmental engineering, among others. In the aerospace industry, CFD is used to design aircraft and spacecraft, optimize aerodynamic performance, and study the behavior of fluids in the presence of high speeds and temperatures. In the automotive industry, CFD is used to optimize engine and vehicle design, improve fuel efficiency, and reduce emissions.

One of the key advantages of CFD is that it allows engineers and scientists to study complex fluid dynamics problems in a controlled and repeatable manner, without the need for expensive and time-consuming experiments. This can save significant time and money and can also help to improve the accuracy of results by allowing researchers to test a wide range of conditions and scenarios.

CFD is also a valuable tool for studying and predicting the behavior of fluids in natural and environmental systems. For example, CFD can be used to model the flow of water in rivers and oceans, study the behavior of pollutants in the atmosphere, and analyze the impact of natural disasters such as floods and tsunamis. And, as used in the development of the disclosed wave break apparatus, it allowed optimization of various features on the device to efficiently dissipate the wave energy.

The wave break apparatus disclosed herein includes a plurality of parallel, spaced apart longitudinally extending wall members each with a multitude of through holes, upper and lower edges as well as first and second opposed side edges. The disclosed apparatus also includes a first end member mounted perpendicular to the first opposed side edges of the wall members and a second end member mounted perpendicular to the second opposed side edges of the wall members.

The apparatus also utilizes at least one flotation member positioned between each of the spaced apart longitudinally extending wall members. The at least one flotation member has an upper surface, a lower surface and first and second side surfaces. At least one upper restraining member is positioned above the flotation member for restraining the flotation member against upward translation by buoyant forces. The wave break apparatus includes an anchor system with one or more winches that employ a rope. The winch is mounted to the upper restraining member and the rope is secured to an anchor at the floor of the body of water. The winches are adjustable to restrain movement of the wave break apparatus when positioned within the water body.

An object of the disclosed apparatus is to reduce the velocity and erosive power of the waves.

A further object of the disclosed apparatus is to employ a wave break that is cost effective.

A further object of the disclosed apparatus is to employ materials that can withstand the corrosive effects of immersion in water for an extended period.

A further object of the disclosed apparatus is to provide a wave break that is positionally adjustable utilizing a plurality of manually operable winches to respond to changes in elevation of the water body as well as sea state.

A further object of the disclosed apparatus is the connectability allowing extended spans of wave break.

BRIEF DESCRIPTION OF THE DRAWINGS

FIG. 14 illustrates a computational fluid dynamics model output detailing water velocities after encountering the wave break apparatus.

DETAILED DESCRIPTION

Figure 1:
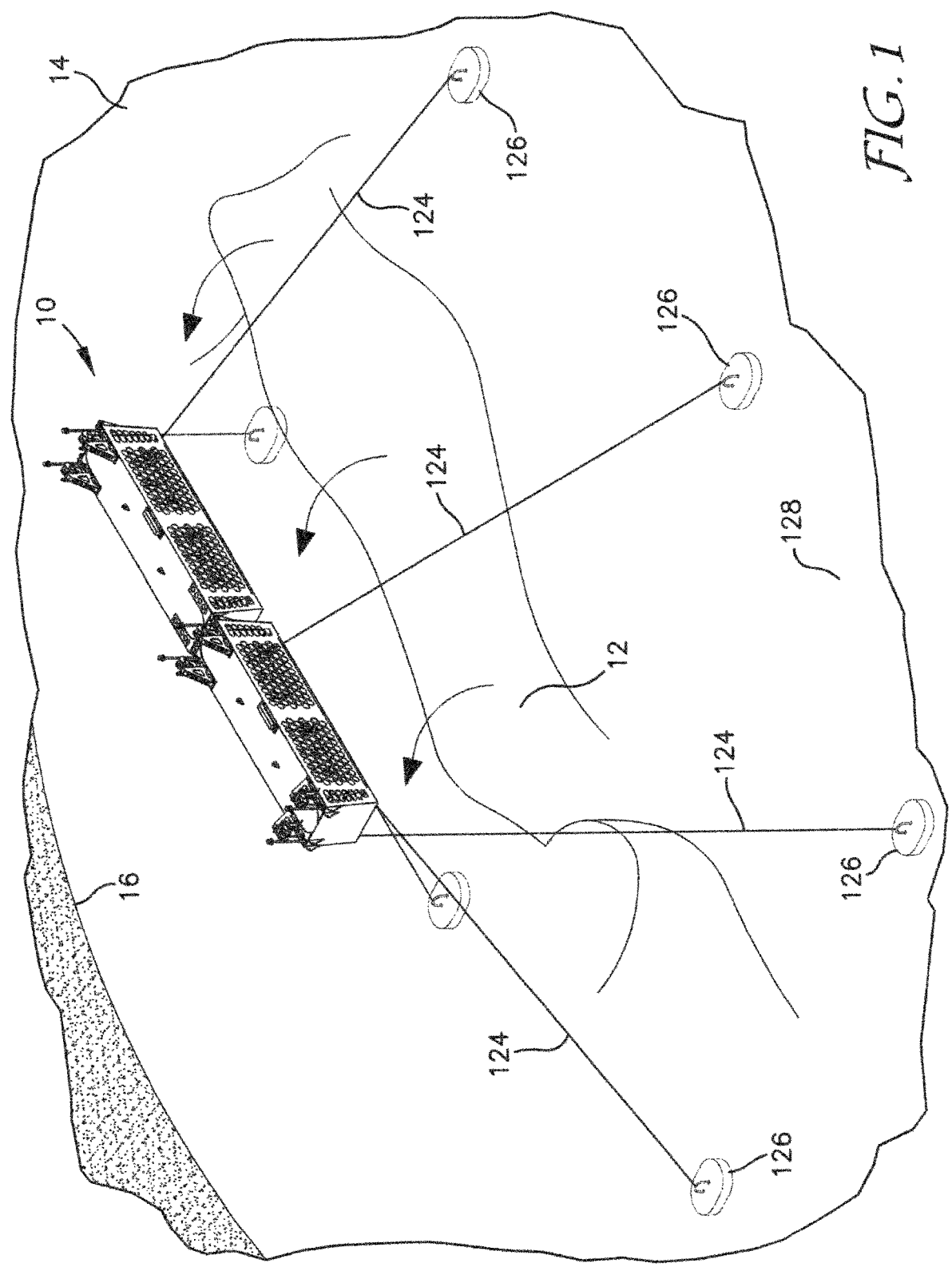
FIG. 1 illustrates an embodiment of the wave break apparatus in a body of water with restraining ropes secured to anchors at the bottom of the body of water.
Figure 2:
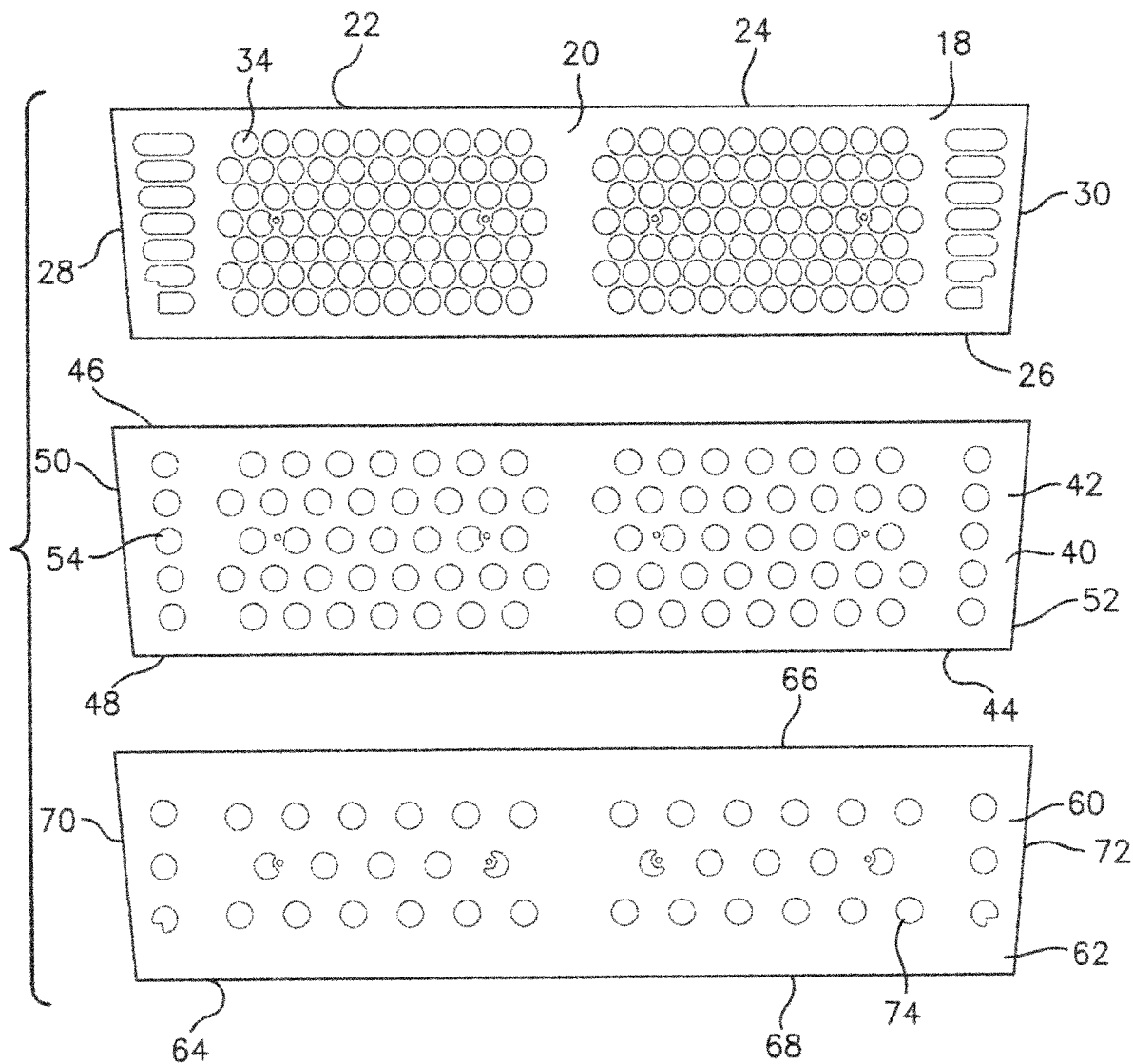
FIG. 2 illustrates embodiments of the three wall members.

FIG. 1 illustrates a floating wave break apparatus 10 used to dissipate wave action 12 in a body of water 14. The wave break apparatus 10 when positioned in a water body 14 near the shoreline 16 serves to dissipate the energy of the wave action 12 and the erosive impacts of the waves action 12. As illustrated at FIG. 2, the floating wave break apparatus 10 utilizes a first longitudinally extending wall member 18 with a first planar surface 20 an opposed second planar surface 22, an upper edge 24, a lower edge 26 and opposed side edges 28, 30. The first longitudinally extending wall member 18 further includes a plurality of through holes 34. The first wall member 18 is the first to encounter wave action incoming from the water body 14 traveling to the shoreline.

The apparatus 10 as disclosed herein, as illustrated at FIG. 2 also includes a second longitudinally extending wall member 40 spaced apart from and parallel to the first longitudinally extending wall member 18. The second wall member 40 is preferably spaced apart from the first wall member 18 by about 25 inches; however, greater, or lesser spans of separation of up to 10 inches are also contemplated by this disclosure. The second longitudinally extending wall member 40 also includes a first planar surface 42, an opposed second planar surface 44, an upper edge 46 a lower edge 48 and opposed side edges 50, 52. The second longitudinally extending wall also includes a plurality of through holes 54; however, there are a fewer number of through holes in the second wall member 40 relative to the first wall member 18.

While the apparatus 10 as disclosed herein may be utilized as an effective wave break and be functional with only first and second wall members 18, 40, a preferred embodiment employs a third longitudinally extending wall member 60 spaced apart from and parallel to the second longitudinally extending wall member 40. The third wall member 60 is preferably spaced apart from the second wall member 40 by about 25 inches; however, as previously noted, this preferred span can vary by up to 10 inches.

The third longitudinally extending wall member 60, as illustrated at FIG. 2, also includes a first planar surface 62, an opposed second planar surface 64, an upper edge 66 a lower edge 68 and opposed side edges 70, 72. The third longitudinally extending wall also includes a plurality of through holes 74; however, there are a fewer number of through holes in the third wall member 60 relative to the second wall member 40.

The wall members 18, 40, 60 are preferably fabricated from medium grade raw steel with a standard gauge in the range of 10-12 (0.1046 to 0.1345 inches). The reference to medium grade raw steel should not; however, be considered as limiting for this disclosure as other materials such as engineered polymers, aluminum, stainless steel, and composites are also contemplated by this disclosure. The through holes 34, 54, 74 in each wall member 18, 40, 60 have a diameter that is preferably in the range of about 6-10 inches and more preferably about 7-9 inches.

CFD modeling of the wave break apparatus 10 has demonstrated that the diameter of the openings 34, 54, 74 impacts the level of force applied to the apparatus from the advancing wave of water and specifically the magnitude of force applied to the wall members 18, 40, 60. Wave action forces repeatedly acting upon the wave break apparatus 10 can result in damage to the apparatus 10 and can potentially dislodge the wave break apparatus anchorage 126 causing undesirable repositioning of the apparatus 10 in the wake zone. The energy extracted from the advancing wave action is effectively diminished as the water impacts each wall member and passes through the openings 34, 54, 74 in each of the wall members 18, 40, 60.

Consequently, CFD modeling is beneficial in that it has been used to optimize the physical structure of the wave break apparatus 10 in order to maximize the reduction in wave velocity and yet to minimize the wave action forces applied to the wall members 18, 40, 60. Table 1 below illustrates the output of the CFD modeling performed on a wave break apparatus 10 as disclosed herein utilizing an advancing wave speed of 60 inches per second or about 3.4 miles per hour.

As can also be seen from the CFD modeling data in Table 1, the load on the wall members 18, 40, 60 decreases when the opening diameter increases from 5 to 7 inches as well as when the opening diameter decreases from 5 to 3 inches, with the total number of holes in each wall member remaining constant. CFD modeling further reveals that the speed of water advancing beyond the wave break apparatus 10 drops most precipitously when the diameter of the openings 34, 54, 74 is about 7-8 inches.

Graphical representation of the movement of water as best illustrated at FIG. 14 reveals that wave speed is substantially reduced after passing through the wave break apparatus 10. The wave speed drops from 60 inches per second to in the range of about 42 to 18 inches per second. Importantly, and as briefly mentioned above, the wave speed is diminished each time the advancing water impacts a wall member 18, 40, 60 and is forced through an opening in that wall member. As detailed above, wall member 40 has fewer openings, of the same diameter, than does wall member 18 and wall member 60 has fewer openings of the same diameter, than does wall member 40.

With passage of the wave action through the openings 35 in the first wall member 18, wave velocity is decreased as illustrated by FIG. 14 and as will be discussed in greater detail below. With the passage of the reduced velocity wave through the lesser number of openings 54 in the second wall member 40 the wave velocity is further decreased. Finally, upon passage of the wave action through the least number of openings 74 in the third wall member 60, the wave action velocity is substantially diminished and will have far less deleterious impact upon sea walls, dock structures and the impact of the waves upon shoreline erosion will be diminished.

TABLE 1

|  | 7-inch hole diameter | 5-inch hole diameter | 3-inch hole diameter |
| --- | --- | --- | --- |
| Force on wall member 18 (lbs) | 2,372 | 3,937 | 4,946 |
| Force on wall member 40 (lbs) | 2,431 | 1,554 | 1,007 |
| Force on wall member 60 (lbs) | 774 | 462 | −77 |
| Total Force | 5,577 | 5,953 | 5,876 |

The first wall member 18 utilizes about eight rows of through holes between the lower edge 26 and the upper edge 24. The second and third wall members 40, 60 employ a fewer number of through holes 54, 74 with the second wall member having a greater number of through holes than the third wall member. All three wall members 18, 40, 60 preferably have a vertical span of about 60 inches though taller or shorter wall members are contemplated by this disclosure. Each successive wall member after the first wall member 18 has progressively fewer through holes 54, 74 therein.

Figure 3:
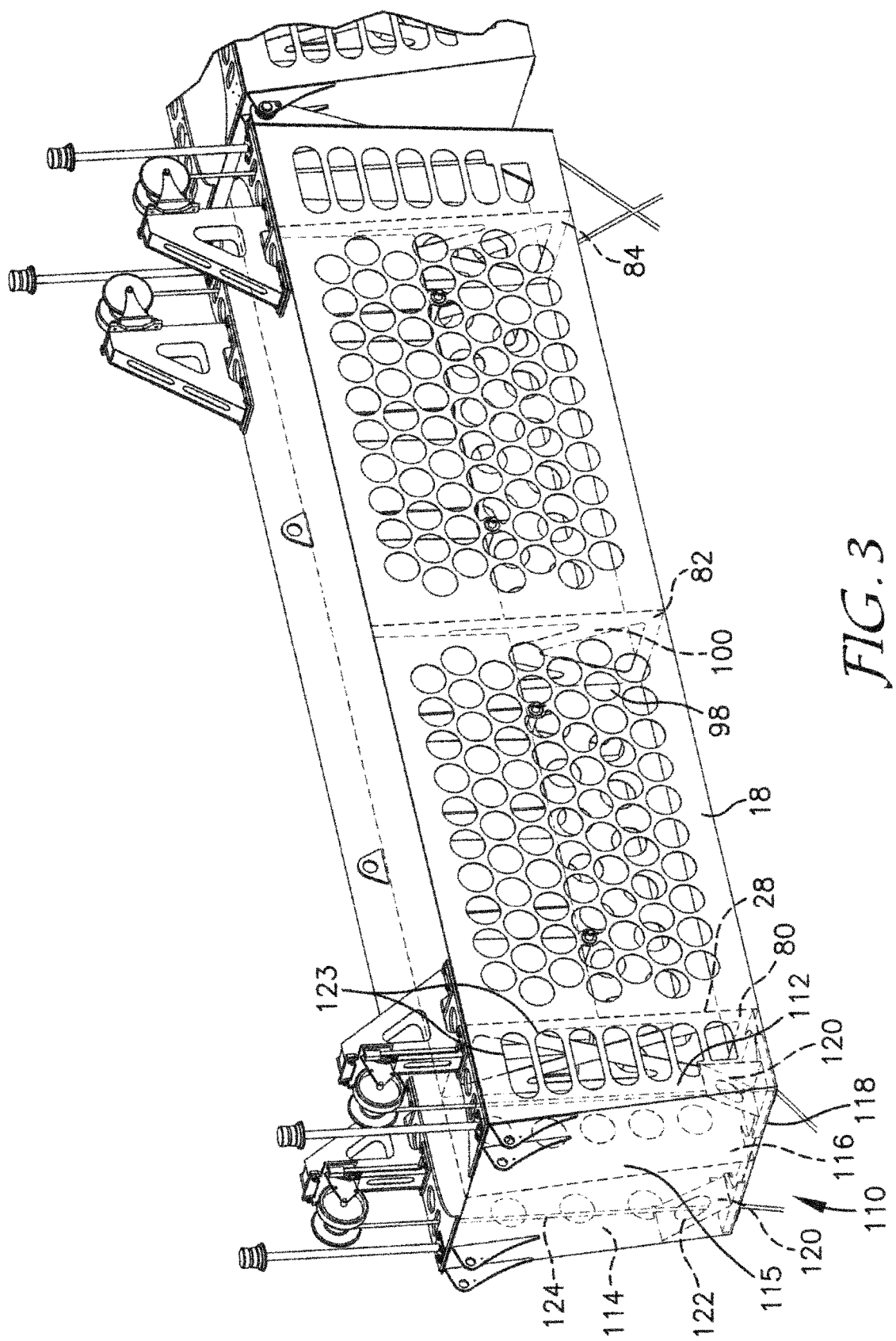
FIG. 3 illustrates an embodiment of the wave break apparatus with bracing members and first end member components shown.

As illustrated at FIG. 3, bracing members 80, 82, 84 are also contemplated for use with the apparatus 10. A first bracing member 80 is positioned at and secured to the first ends 28, 50, 70 of the three wall members 18, 40, 60. A second bracing member 82 is positioned mid-span of each of the three wall members 18, 40, 60 and a third bracing member is positioned and secured to the second ends 30, 52, 72, shown at FIG. 2, of the three wall members. All three bracing members 80, 82, 84 may avoid interrupting the span of each of the wall members 18, 40 60 depending upon the anticipated need for rigidity of the apparatus 10 (i.e., likely sea state to be encountered) and managing the complexity of fabrication of the apparatus.

Figure 7:
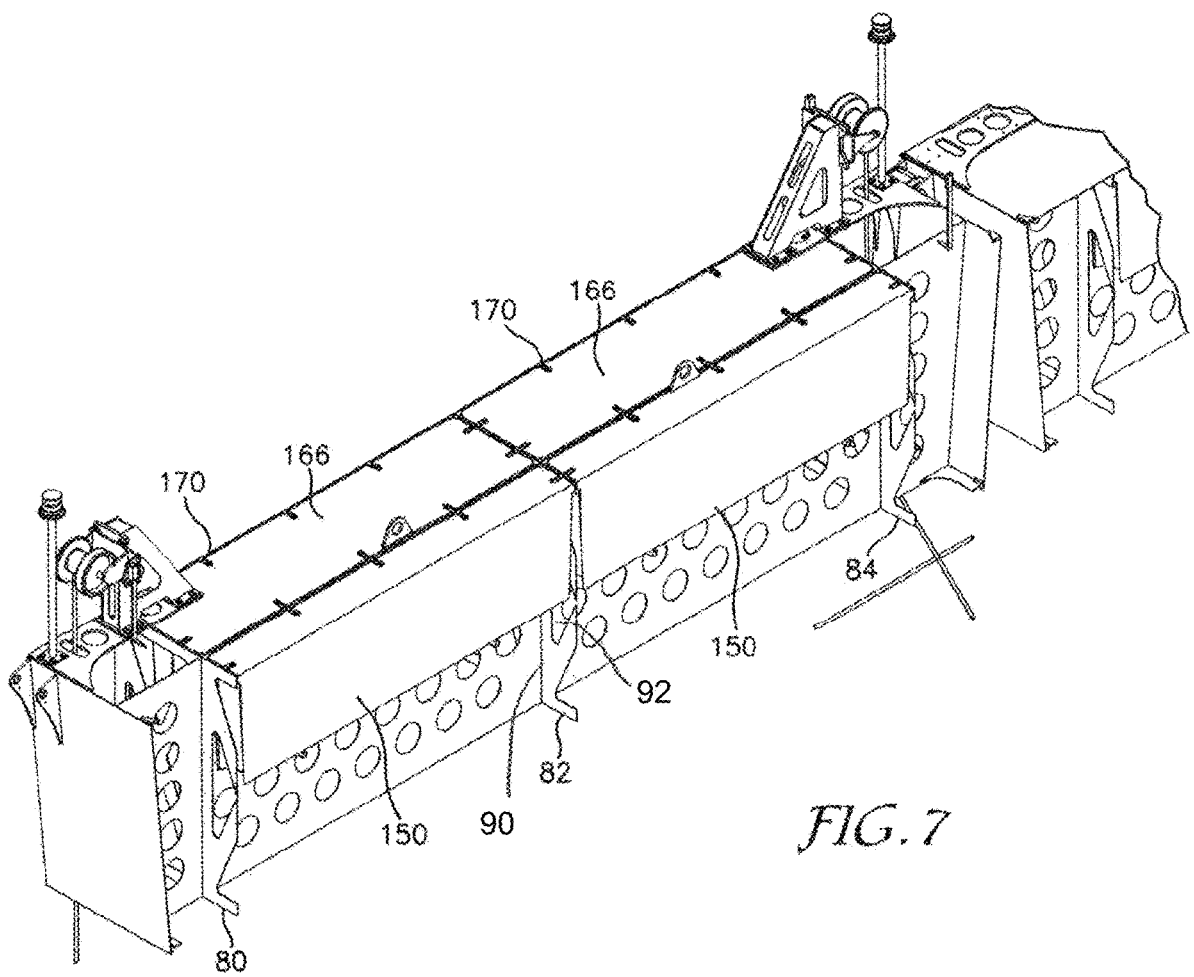
FIG. 7 illustrates an embodiment of the wave break flotation member configuration positioned against the second wall member.

A preferred embodiment of the apparatus requires the bracing members 80, 82, 84 to interrupt the span of all three wall members 18, 40, 60. In a preferred embodiment the mid-span bracing member 82 is welded to the internal end edges 90, 92 of all three wall members 18, 40, 60 as best illustrated at FIG. 7. Likewise, end cap bracing members 80, 84 are secured respectively to the first end side edges 28, 50, 70 and second end side edges 30, 52, 72 as best illustrated at FIG. 2. A preferred embodiment of the bracing members utilizes medium grade steel with a thickness of the same gauge as of the wall members 18, 40, 60 detailed above in a rectangular configuration with intersecting diagonal cross braces 98, 100 to maintain rigidity of the bracing members. The bracing members 80, 82, 84 serve to prevent buckling or folding over of the wall members 18, 40, 60 effectively improving overall rigidity of the apparatus.

FIG. 3 also illustrates a first end member 110 mounted to the first side edges 28, 50, 70 of the three wall members 18, 40, 60 with the first bracing member 80 interposed therebetween. The first end member 110 is a framework that includes a pair of opposed side walls 112, 114, a front wall 115, a mid-wall 116 for providing structural support, a bottom panel 118, opposed diagonal brace members 120 secured to both the bottom panel 118 and the opposed side walls 112, 114. Each diagonal brace 120 has a through hole 122 for allowing passage of the ropes 124 restraining the anchors 126 at the floor 128 of the body of water 14 (see also FIG. 1). The side walls 112, 114 of the first end member 110 also include a plurality of openings 123 to allow wave action water to enter and exit the end member 110.

An exemplary restraining rope 124 is AmSteel® II manufactured by Samson®. The AmSteel® II rope is highly durable and has a specific gravity greater than 1.0 so it does not float in water and should slack develop in the rope during use there is a diminished likelihood of the rope becoming entangled in the prop of a passing watercraft. The use of other ropes, including wire ropes and natural fiber ropes are also contemplated by this disclosure.

Figure 4:
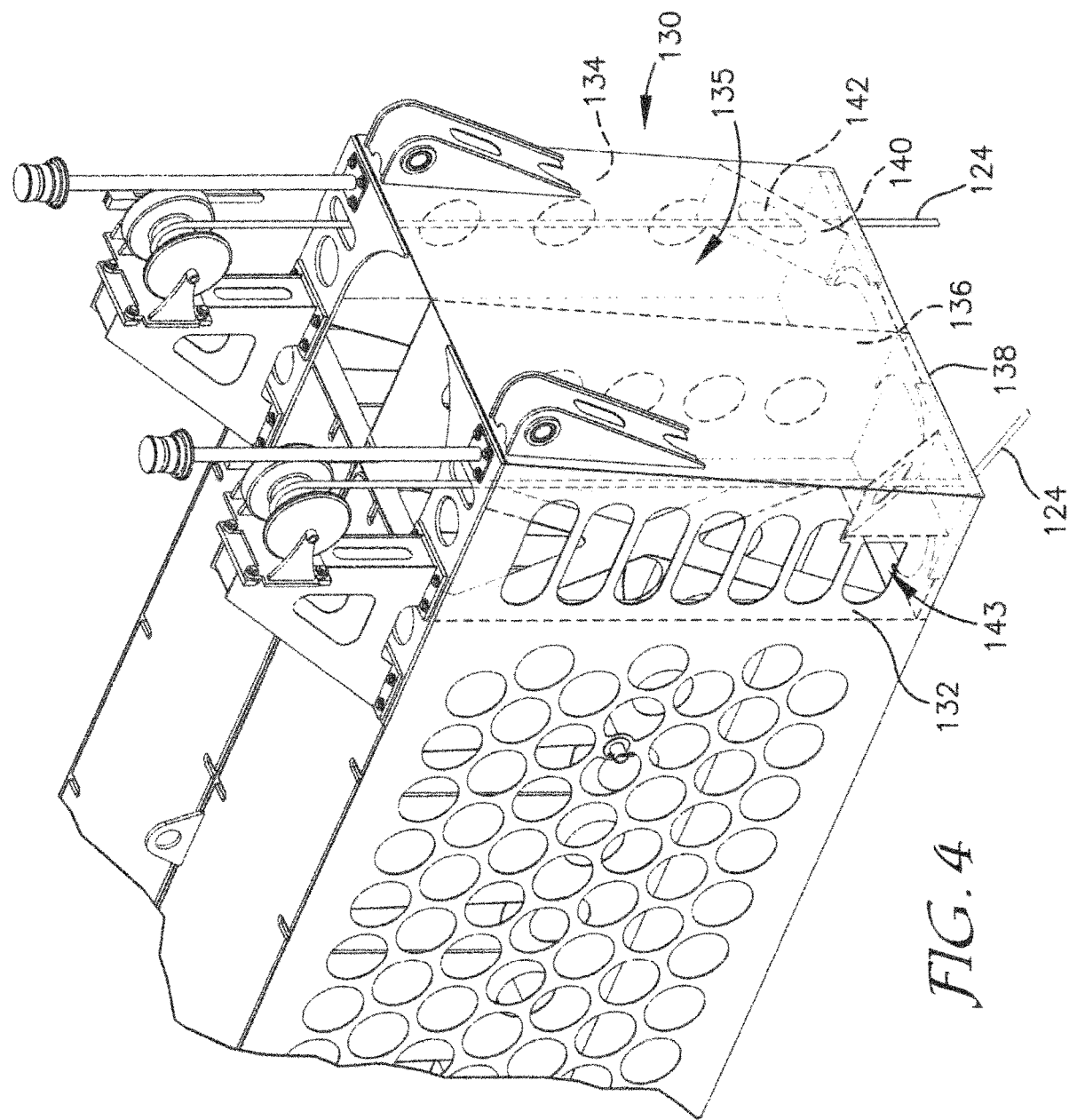
FIG. 4 illustrates an embodiment of the wave break apparatus with second end member components.

FIG. 4 illustrates a second end member 130 secured to the second opposed side edges 30, 52, 72 of the wall members 18, 40, 60. The second end member 130 is also a framework including a pair of opposed side walls 132, 134, a front wall 135, a mid-wall 136 providing structural support, a bottom panel 138, opposed diagonal brace members 140 each with a through hole 142 for allowing passage therethrough of the restraining ropes 124 to the anchors 126 at the floor 128 of the body of water 14. The side walls 132, 134 of the second end member 130 also include a plurality of openings 143 to allow wave action water to enter and exit the end member 130.

Figure 5:
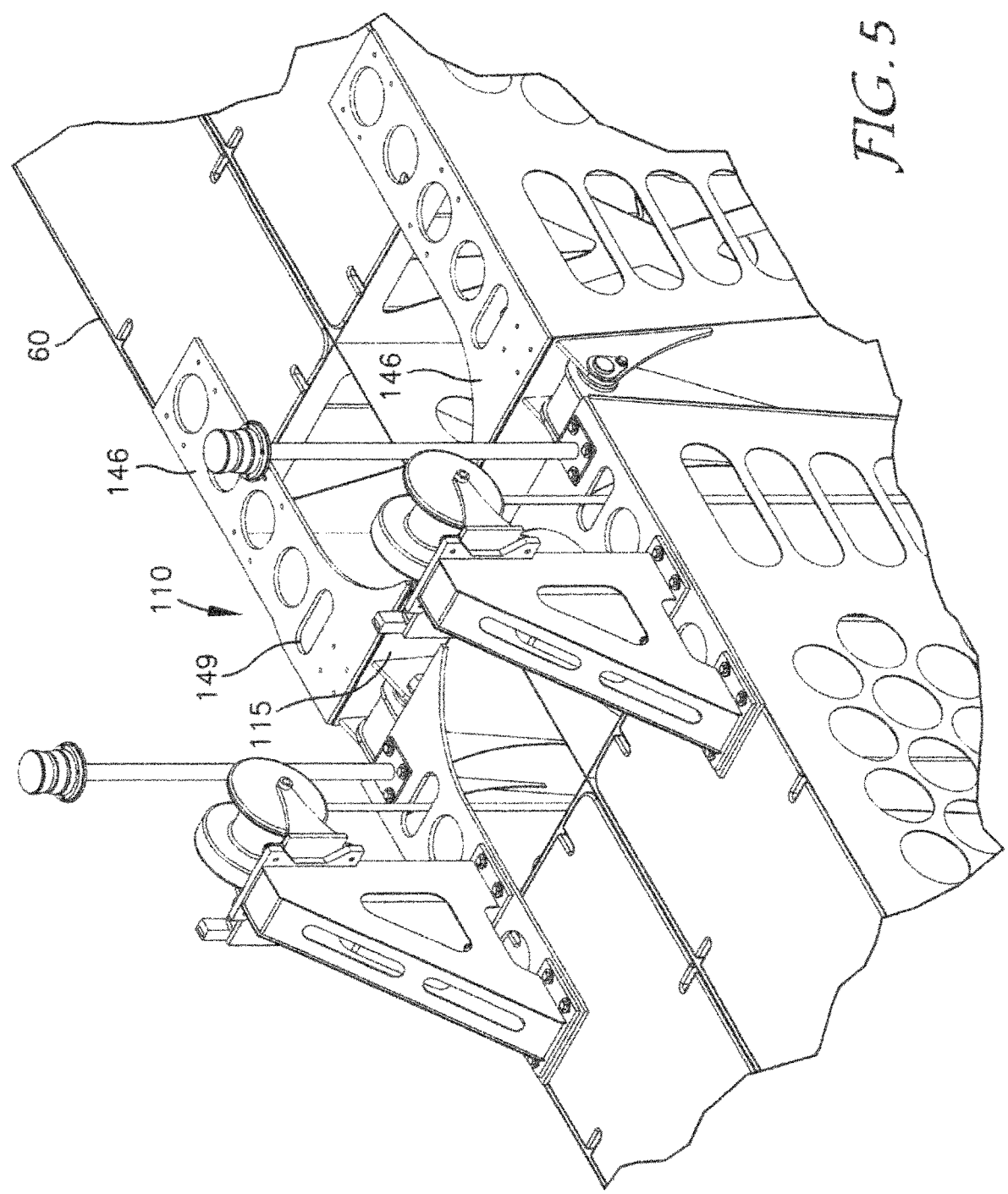
FIG. 5 illustrates an embodiment of the wave break apparatus partial caps.

The components of the first and second end members 110, 130 are preferably fabricated from medium grade steel of the same gauge as previously referenced. As illustrated at FIGS. 2 and 5, the end members 110, 130 also each employ two partial caps 146. The partial caps 146 preferably span and are secured to the upper edges 24 and 66 of the first and third wall members 18, 60 and then span and are secured to the upper edges of the front walls 115, 135 of the first and second end members 110, 130.

These partial caps 146 stiffen the end members 110, 130 and provide a landing space for hardware, to be more fully detailed below, and include an opening 149 through which the restraining ropes 124 may pass downward to the diagonal brace member 120, 140 before the restraining rope exits out of the apparatus 10 to the anchors 126 at the floor 128 of the body of water 14.

Figure 6:
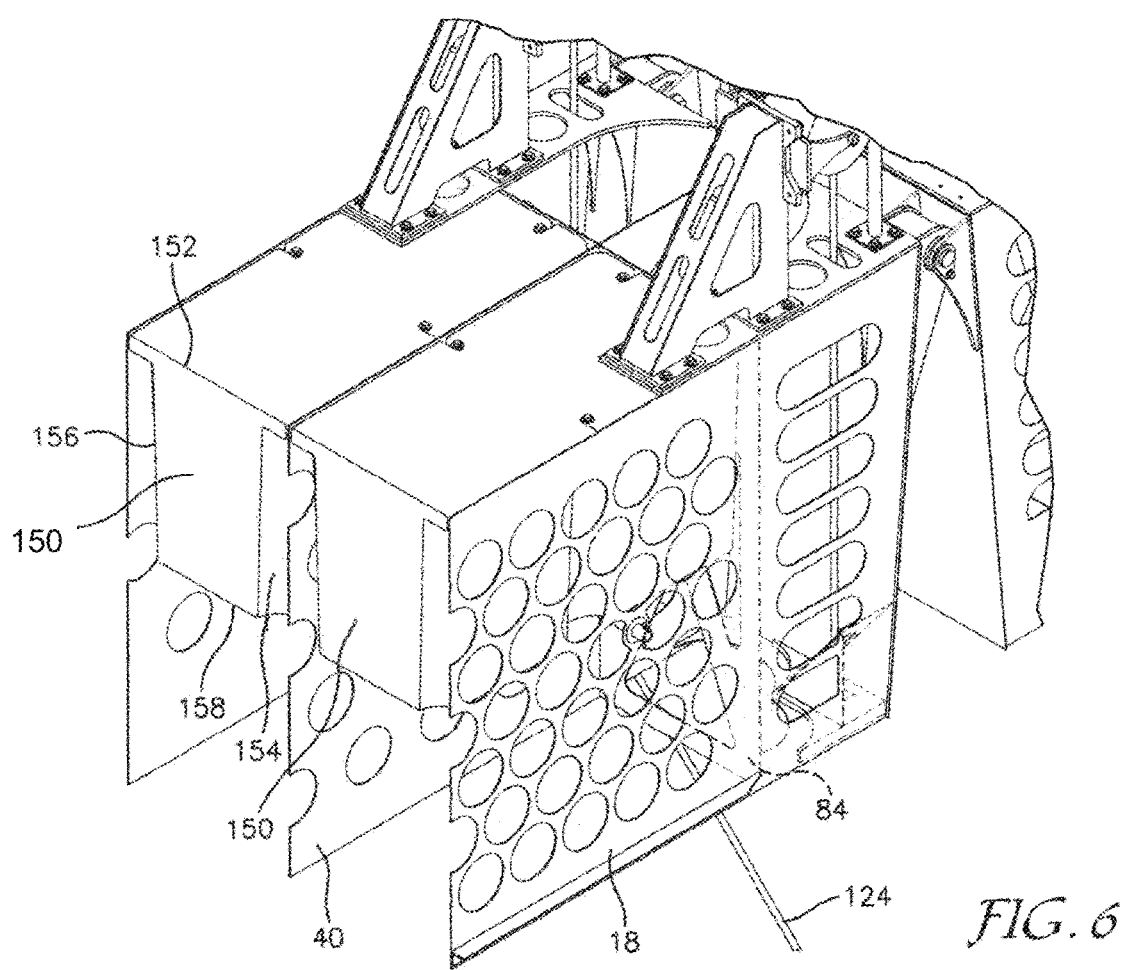
FIG. 6 illustrates an embodiment of the wave break flotation member configuration as among the three wall members.

FIG. 6 illustrates a pair of flotation members 150 positioned between the three longitudinally extending wall members 18, 40, 60 and are just two of a total of four flotation members 150 that span between the bracing members at the ends 80, 84 and the mid-span bracing member 82. As illustrated at FIG. 7, the mid-span bracing member 82 in a preferred embodiment of the apparatus 10 prevents insertion of a flotation member 150 that spans the entire distance between the longitudinally opposed end edges of the wall members 18, 40, 60. The flotation members 150 include an upper surface 152, first and second side surfaces 154, 156 and a lower surface 158. The flotation member 150 is preferably fabricated from encapsulated expanded polystyrene; however, alternative formulations of flotation members, for example among others, marine polyurethane, is also contemplated by this disclosure.

Figure 8:
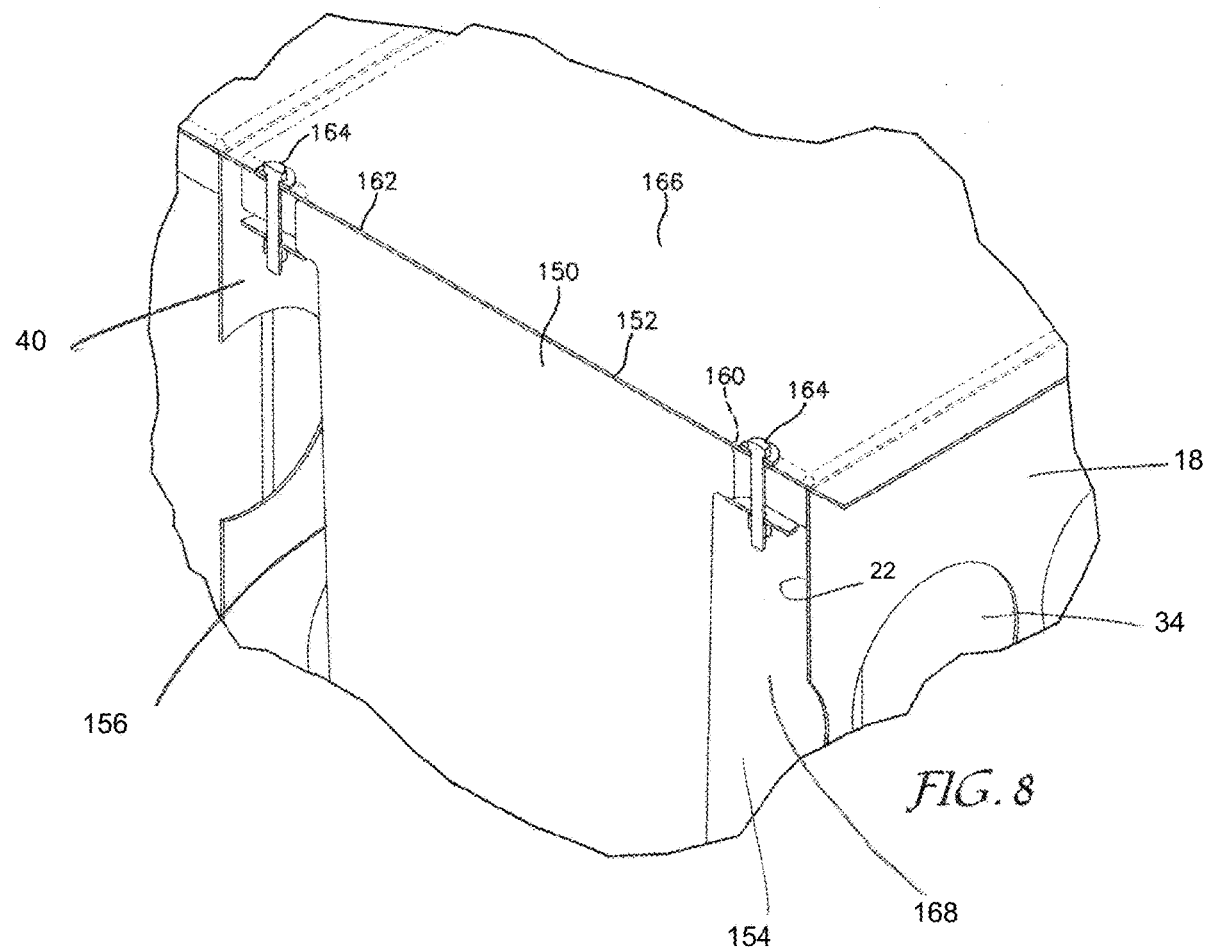
FIG. 8 illustrates an embodiment of the wave break flotation member fastening members.

As best illustrated at FIG. 8, the first and second side surfaces 154, 156 of the flotation members 150 include outwardly extending flanges 160, 162 proximate the upper surface 152 of the flotation members 150. The outwardly extending flanges 160, 162 are configured for engagement with a fastener 164 extending downwardly from the restraining member 166. Because of the outwardly extending flanges 160, 162, the first and second side surfaces 154, 156 of the flotation members 150 are spaced away from the adjacent wall members 18, 40 forming a gap 168 therebetween in the range of about 1 to 3 inches. This gap between the first side surface 154 of the flotation member 150 and the interior surface 22 of the first wall member 18 provides a route for water to transit upon a wave impacting the anchored apparatus 10 and forcing water through the plurality of through holes 34.

FIG. 7 also illustrates the placement of the restraining member 166 as detailed above being positioned over the flotation members 150 with the objective of restraining the flotation member against upward translation by buoyant forces when the flotation member 150 is partially, or fully, submerged in the body of water 14. The restraining member 166 is preferably a continuous flat plate secured in position with fasteners 170 being received into bent over flanges (not shown) formed at the upper edges 24, 46, 66 of the longitudinally extending wall members 18, 40, 60. It is contemplated that the restraining member 166 could alternatively be a grate or even a plurality of discrete flat bars spanning across the wall members 18, 40, 60.

Figure 9:
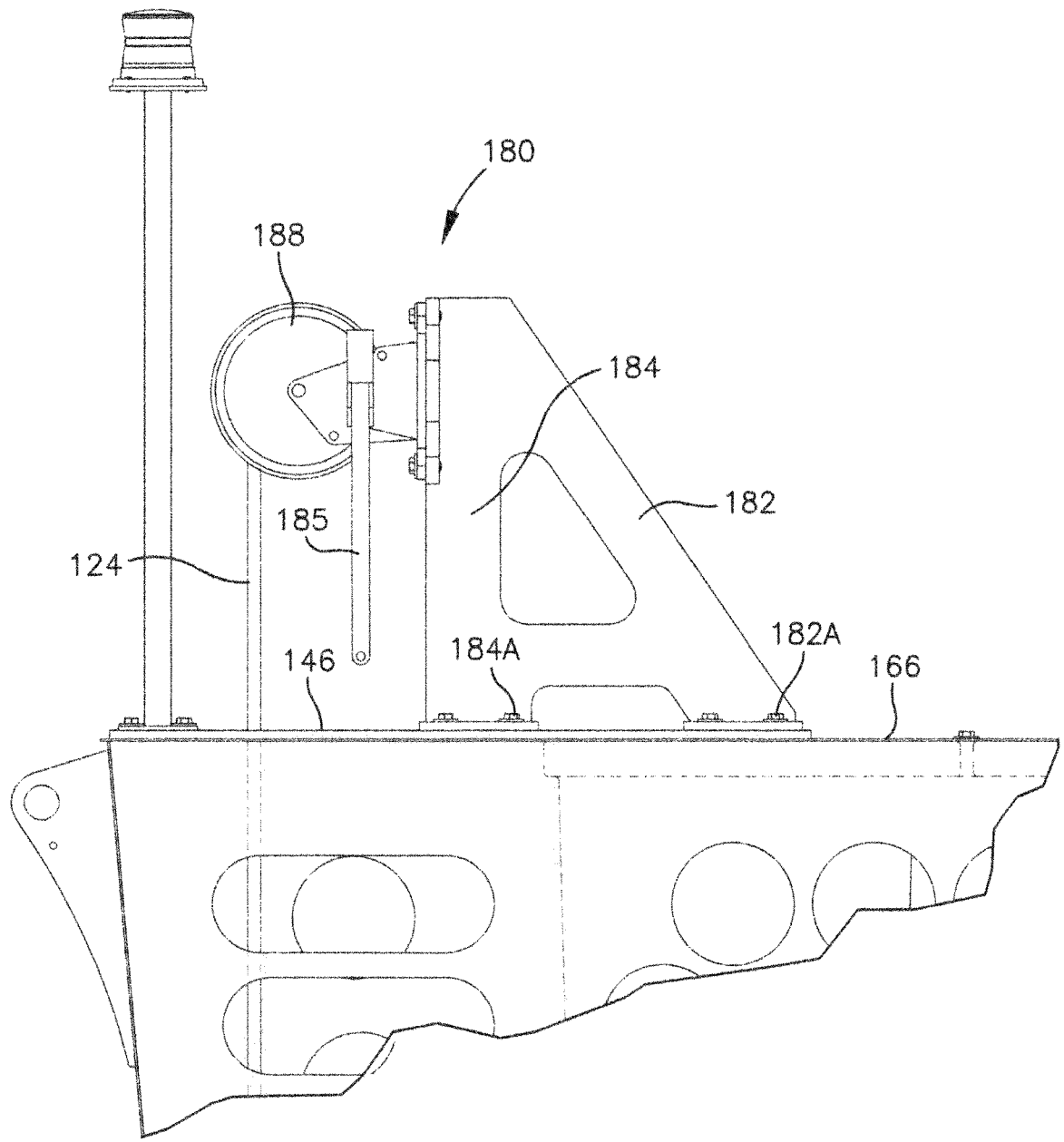
FIG. 9 illustrates an embodiment of the winch tower.

As best illustrated at FIG. 9, the apparatus 10 as disclosed herein also includes an anchor system with at least one winch 180 and rope 124 combination. In a preferred embodiment the apparatus 10 utilizes a total of four winches 180 to properly restrain the apparatus 10 in position against movement from wave action. The winch 180 is partially mounted atop the restraining member 166 and partially mounted atop the partial cap 146. The canted leg 182 of the winch 180 is secured with fasteners 182A to the restraining member 166 and the vertical leg 184 of the winch is secured with fasteners 184A to the partial cap 146. The winches 180 also utilize crank arms 185 allowing manual adjustment of the tension on each restraining rope 124 to optimize the position of the apparatus 10.

The four winches 180 of the preferred embodiment of the apparatus 10 are each positioned atop a separate restraining member 166 and partial cap 146. The drum 188 of the winch 180 upon which the restraining rope 124 is wrapped may be manually adjusted with the crank arm 185 to regulate the tension on the rope 124.

In preparation for placement of the apparatus 10 into the body of water 14, the restraining members 166 are preferably removed so that four flotation members 150 of the preferred embodiment may be secured with fasteners 164, as best illustrated at FIG. 8. The flotation members 150 are then positioned into the four chambers formed within the apparatus 10 by the wall members 18, 40, 60 and the bracing members 80, 82, 84.

Figure 10:
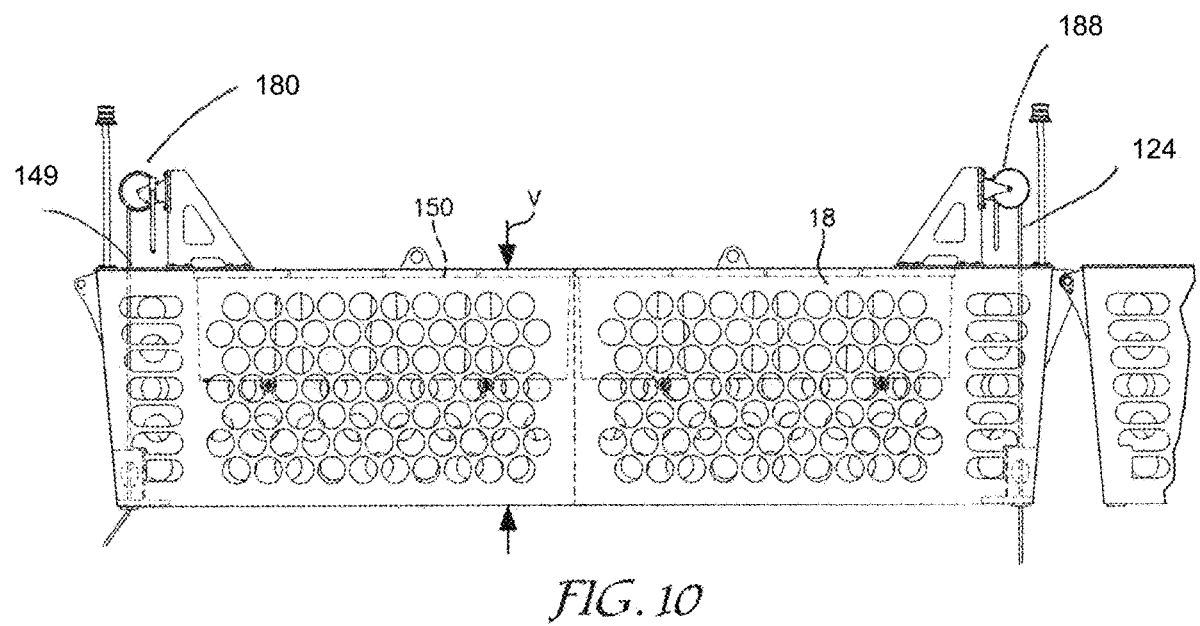
FIG. 10 illustrates an embodiment of the wave break apparatus and the flotation members installed therein.

FIG. 10 illustrates that in a preferred embodiment, the flotation members 150 do not extend downwardly the entire vertical span "V" (for example, distance between the upper edge 24 and lower edge 26 of first wall member 18) of the wall members 18, 40, 60. The downward extension of the flotation members 150 is roughly one-half of the vertical span V of the wall members 18, 40, 60. Once the flotation members 150 are secured in position with the fasteners 164 the apparatus 10 may be placed in the water body 14 proximate the location where it is to ultimately serve as a wave break. Once in the water the restraining ropes 124 are unspooled from the winch roller 188 on each of the four winches 180. After the second end of the rope 124 passes through the opening 149 in the partial cap 146 as well as the opening 122, 142 in the diagonal brace 120, 140, the anchor 126 is attached to the end of the restraining rope 124 opposite the end attached to the roller 188.

As best illustrated at FIG. 1, the anchors 126, preferably four, are positioned on the floor 128 of the water body 14 at an outward diagonal distance from the apparatus 10. The winches 180 are then adjusted to remove slack from the restraining rope 124 and the apparatus is uniformly submerged leaving only about 12-15 inches of the apparatus 10 above the surface of the body of water 14.

As a wave advances toward the apparatus 10 it initially impacts the first wall member 18. Advancing water moves through the holes 34 or is obstructed by the area adjacent the holes. For the water that advances through the holes 34 it next advances past the gap 168 and impacts the first side surface 156 of the flotation member 150. Because of the solid nature of the flotation member 150 the advancing water is forced downward into the gap 168 and finally encounters a lack of obstruction at the lower surface 158 of the flotation member 150.

By the time the advancing water has moved to the lower surface 158 of the flotation member 150 it has lost a considerable portion of the energy that it initially had upon impact with the apparatus 10 due to friction losses resulting from interaction with the wall member 18 and the first side surface 156 of the flotation member 150. Once the water has advanced to the lower surface 158 of the flotation member 150 it can finally move forward (in the direction of the wave action) where it next encounters the second wall member 40 of the flotation member 150. As indicated above, the second wall member 40 has fewer through holes 54 than the first wall member 18.

The second wall member 40 being less porous (fewer through holes) than the first wall member resists passage of the water thereby extracting even more energy from the advancing wave of water. After passing through the openings 54 in the second wall member 40 the water advances across the next chamber beneath the flotation members 150 and encounters the third wall member 60.

The third wall member 60 has even fewer holes 74 than the second wall member 40 and water attempting to escape through the holes 74 will be placing pressure on the third wall member 60 further diminishing the energy carried by the advancing water. Numerical modeling using Computational Fluid Dynamics (CFD) reveals that a substantial portion of the energy initially carried by the wave action is lost upon contact with the apparatus 10 thereby reducing the potential for wave action causing damage to the shoreline, docks, or other floating structures.

Figure 11:
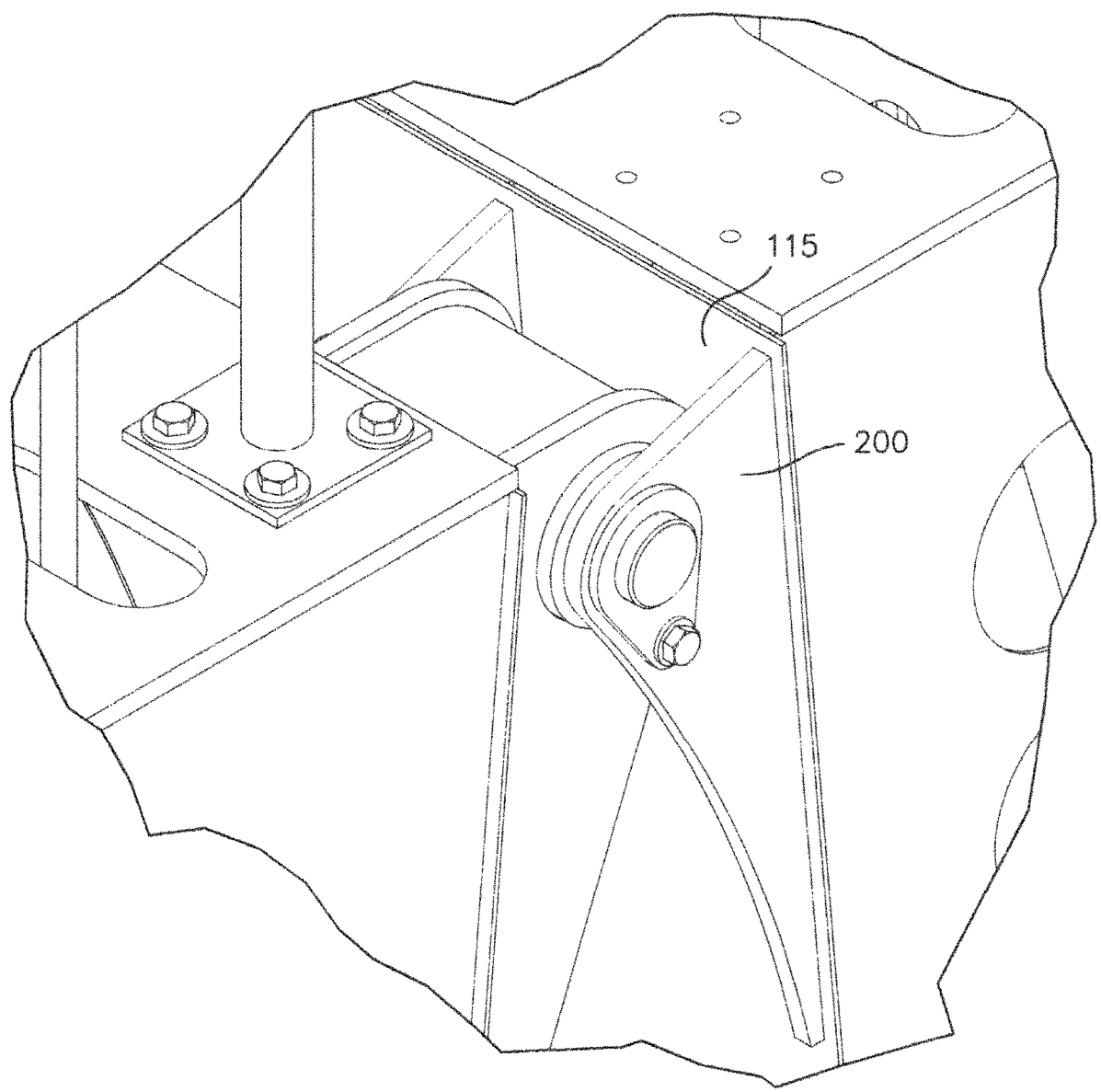
FIG. 11 illustrates an embodiment of the hinge members of the wave break apparatus.
Figure 12:
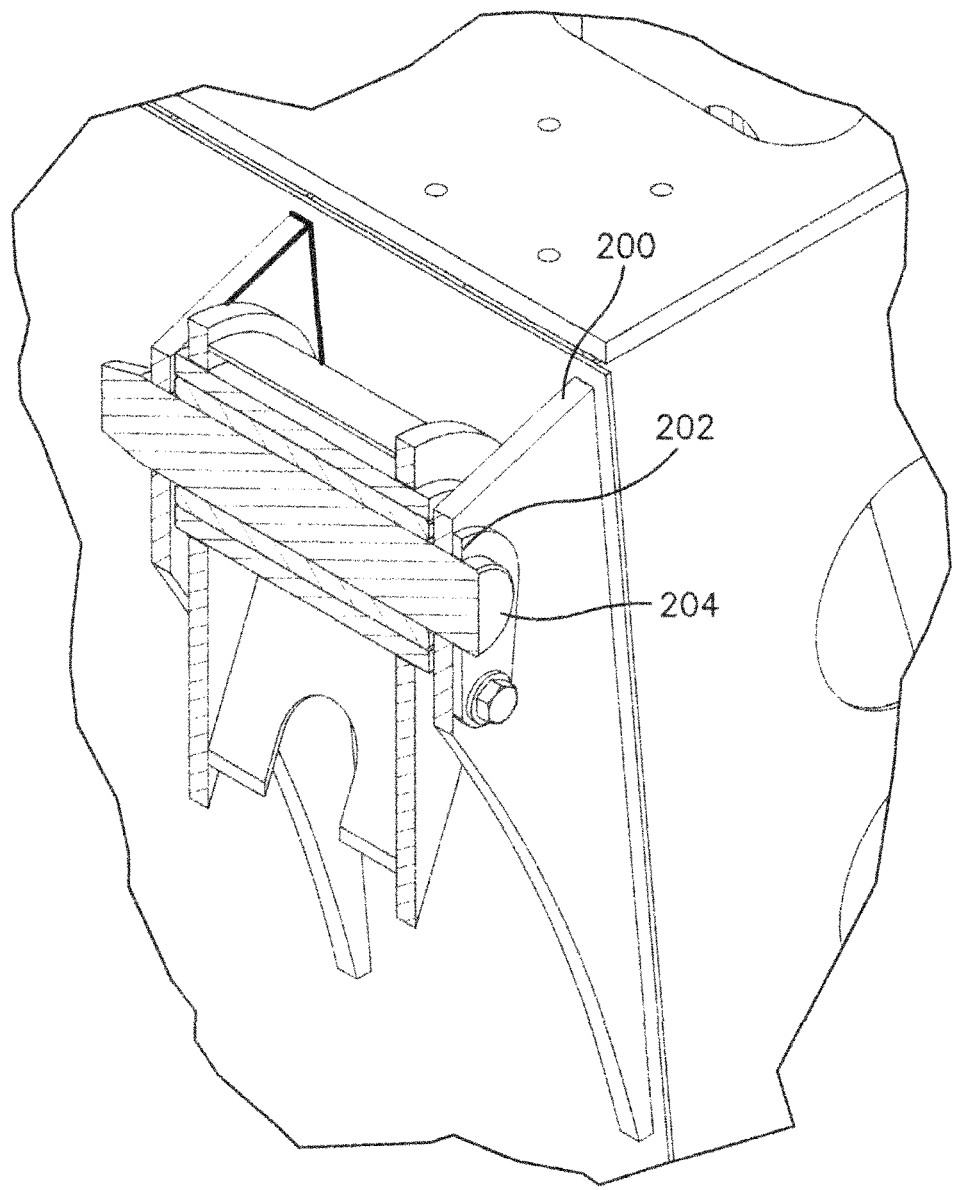
FIG. 12 illustrates an embodiment of a cut-away hinge of the wave break apparatus.

The apparatus 10 as disclosed herein is also highly modular in nature and connectable to address protection of long shorelines or extended docks. As illustrated at FIGS. 4, 11 and 12, mounted to the front walls 115, 135 of the first and second end members 110, 130 are arcuate hinge plates 200. Preferably two hinge plates 200 are mounted to each front wall 115, 135 with each hinge plate having a hole 202 therein. As illustrated at FIG. 12 a pin 204 is passed through the holes 202 of the hinge plates 200 thereby locking one apparatus 10 to the next. The wave break apparatus 10 can be extended a considerable distance with the use of the hinge plates 200 and locking pins 204.

Figure 13:
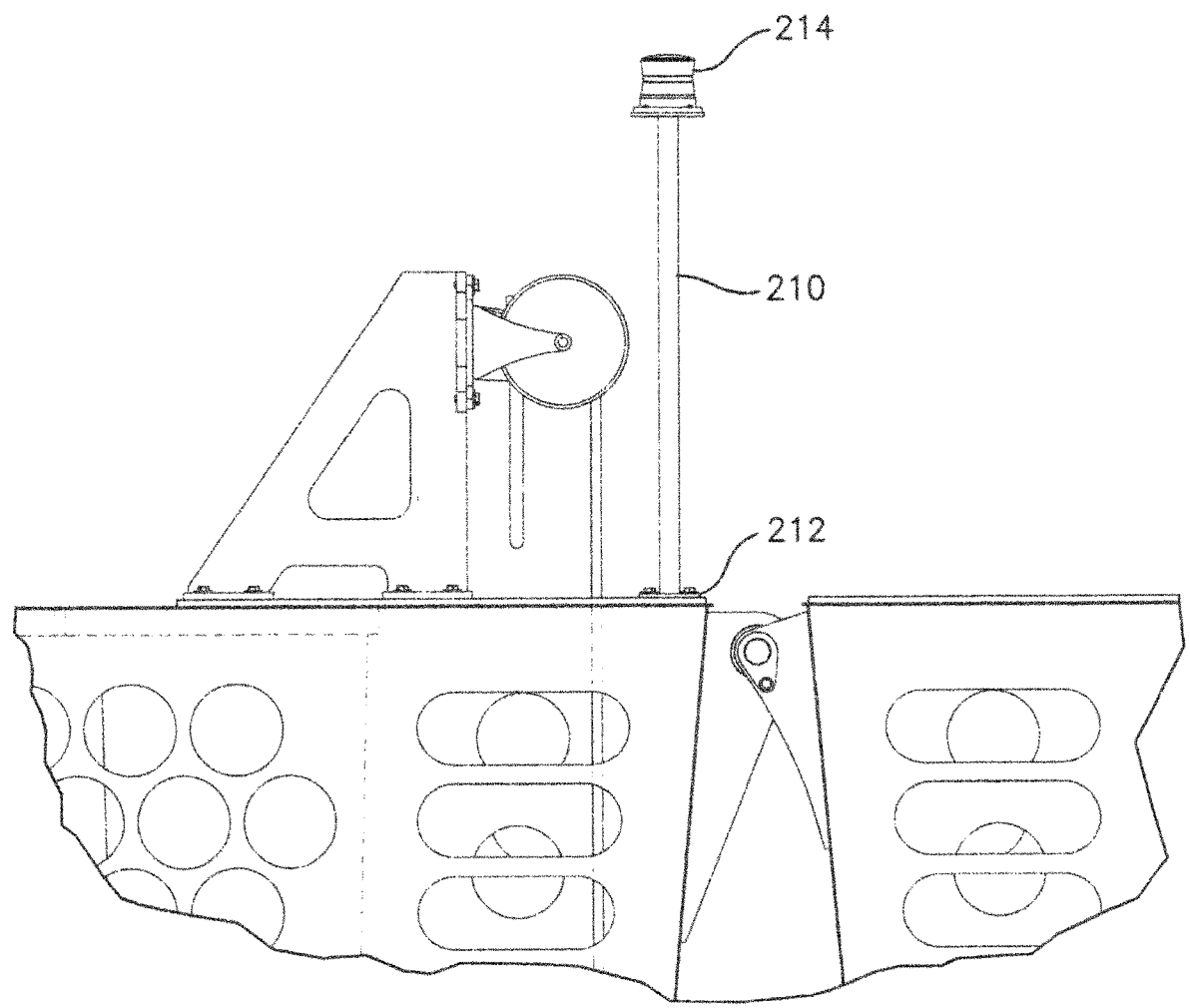
FIG. 13 illustrates an embodiment of a light tower mounted to the wave break apparatus.

Another highly useful feature of the apparatus 10 as disclosed herein is the use of light towers 210 as illustrated at FIG. 13. The light towers are preferably secured to a landing pad 212 upon the partial caps 146. A preferred embodiment of the light tower 210 is one that extends above the landing pad 212 with a shaft in the range of about 30-40 inches with a solar powered light 214 at the very top. Preferably a total of four of these light towers 210 are positioned around each wave break apparatus 10 to alert boaters of the presence of the wave breaks, particularly at night when the solar powered lights are illuminated.

FIG. 14 illustrates pictorially the output of a computational fluid dynamics model of the wave break apparatus. These modeling results reveal that wave action water velocities 220 diminish substantially for the water passing through the holes 34 of the wall members 18, 40, 60 of the wave break apparatus 10 and to a lesser degree the velocities of water passing beneath 222 and to the sides 224 of the wave break apparatus 10. As previously noted, the water passing to the sides 224 in the modeling at 60 inches per second, is far greater than the speed of the water passing beneath 222 and through 220 the apparatus 10 which resulted in wave action speeds of about 42 and 18 inches per second respectively. The computational fluid dynamics modeling demonstrated substantial reductions in wave velocity upon the wave contacting the apparatus 10.

The disclosed apparatus should not be construed as limiting in any way. Instead, the present disclosure is directed toward all novel and nonobvious features and aspects of the various disclosed embodiments, alone and in various combinations and sub-combinations with one another. The disclosed apparatus is not limited to any specific aspect or feature or combination thereof, nor do the disclosed embodiments require that any one or more specific advantages be present, or problems be solved.

In view of the many possible embodiments to which the principles of the disclosed invention may be applied, it should be recognized that the illustrated embodiments are only examples of the disclosure and should not be taken as limiting the scope of the invention. Rather, the scope of the invention is defined by the following claims. I therefore claim as my invention all that comes within the scope of these claims.

The disclosure presented herein is believed to encompass at least one distinct invention with independent utility. While the at least one invention has been disclosed in exemplary forms, the specific embodiments thereof as described and illustrated herein are not to be considered in a limiting sense, as numerous variations are possible. Equivalent changes, modifications, and variations of the variety of embodiments, materials, compositions, and methods may be made within the scope of the present disclosure, achieving substantially similar results. The subject matter of the at least one invention includes all novel and non-obvious combinations and sub-combinations of the various elements, features, functions and/or properties disclosed herein and their equivalents.

Benefits, other advantages, and solutions to problems have been described herein regarding specific embodiments. However, the benefits, advantages, solutions to problems, and any element or combination of elements that may cause any benefits, advantage, or solution to occur or become more pronounced are not to be considered as critical, required, or essential features or elements of any or all the claims of at least one invention.

Many changes and modifications within the scope of the instant disclosure may be made without departing from the spirit thereof, and the one or more inventions described herein include all such modifications. Corresponding structures, materials, acts, and equivalents of all elements in the claims are intended to include any structure, material, or acts for performing the functions in combination with other claim elements as specifically recited. The scope of the one or more inventions should be determined by the appended claims and their legal equivalents, rather than by the examples set forth herein.

Benefits, other advantages, and solutions to problems have been described herein regarding specific embodiments. Furthermore, the connecting lines, if any, shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions.

The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

In the detailed description herein, references to "one embodiment," "an embodiment," "an example embodiment," etc., indicate that the embodiment described may include a feature, structure, or characteristic, but every embodiment may not necessarily include the feature, structure, or characteristic. Moreover, such phrases are not necessarily referring to the same embodiment. Further, when a feature, structure, or characteristic is described relating to an embodiment, it is submitted that it is within the knowledge of one skilled in the art to affect such feature, structure, or characteristic relating to other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. § 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention has been described above with reference to one or more preferred embodiments, it will be appreciated that various changes or modifications may be made without departing from the scope of the invention as defined in the appended claims.

We claim:

1. A floating wave break apparatus to dissipate wave action in a body of water, the apparatus comprising:
a first longitudinally extending wall member with a first planar surface an opposed second planar surface, an upper edge, a lower edge and opposed side edges, the first longitudinally extending wall further comprising a plurality of through holes therein;
a second longitudinally extending wall member spaced apart from and parallel to the first longitudinally extending wall member, the second longitudinally extending wall member further comprising a first planar surface, an opposed second planar surface, an upper edge a lower edge and opposed side edges, the second longitudinally extending wall comprising a plurality of through holes;
wherein the first wall member is configured to face incoming waves and has an aggregate open area of through holes greater than that of the second wall member;
a flotation member disposed between the first and second wall members, the flotation member comprising an upper surface, a lower surface, and first and second side surfaces, the first and second side surfaces being spaced from the respective opposing planar surfaces of the first and second wall members to define lateral flow gaps;
at least one restraining member disposed above the flotation member and secured to the upper edges of the first and second wall members, the restraining member overlying and mechanically interfering with the upper surface of the flotation member to restrain upward translation of the flotation member caused by buoyant forces; and
an anchor system comprising at least one winch drum and rope combination, the winch drum mounted to the restraining member and the rope with a first end secured to the winch drum and a second end secured to an anchor at the floor of the body of water, wherein the tension in the rope is adjustable with the winch drum to restrain movement of the wave break apparatus.

2. The floating wave break apparatus of claim 1, wherein the second longitudinally extending wall member comprises fewer through holes than the first longitudinally extending wall member.

3. The floating wave break apparatus of claim 1, wherein the rope comprises at least one of a metal cable, a synthetic fiber material or a natural strand.

4. The floating wave break apparatus of claim 1, wherein the flotation member is comprised of encapsulated expanded polystyrene.

5. The floating wave break apparatus of claim 1, wherein the lower edge of the wall members extends beneath the lower surface of the flotation member.

6. The floating wave break apparatus of claim 1, wherein the first and second side surfaces of the flotation member are each spaced apart from an adjacent wall member.

7. The floating wave break apparatus of claim 6, wherein the first and second side surfaces of the flotation member are spaced apart from the adjacent wall members forming a gap therebetween in the range of about 1 to 3 inches.

8. The floating wave break apparatus of claim 7, wherein wave action water after passing through the plurality of holes in the first wall member adjacent the flotation member is directed downward into the gap thereby dissipating wave action energy.

9. The floating wave break apparatus of claim 1, wherein a first floating wave break apparatus is connectable to a second floating wave break apparatus at a pivotal hinge.

10. The floating wave break apparatus of claim 1, wherein the at least one restraining member is four restraining members.

11. The floating wave break apparatus of claim 1, wherein the at least one winch drum is four winch drums with each winch drum rotatably mounted to a separate tower.

12. The floating wave break apparatus of claim 11, wherein each tower comprises a vertical leg and a canted leg with each leg mounted atop a partial cap.

13. The floating wave break apparatus of claim 1, wherein a third longitudinally extending wall member is spaced apart from the second longitudinally extending wall member and parallel to the first and second longitudinally extending wall members, the third longitudinally extending wall member further comprising first and second opposed planar surfaces, an upper edge a lower edge and opposed side edges, the third longitudinally extending wall member further comprising a plurality of through holes therein.

14. The floating wave break apparatus of claim 13, wherein the third longitudinally extending wall member comprises fewer through holes than the first and second longitudinally extending wall member.

15. The floating wave break apparatus of claim 1, wherein the diameter of the through holes is in the range of about 6 to 10 inches.

16. The floating wave break apparatus of claim 15, wherein the first, second and third longitudinally extending wall members are spaced apart from one another in the range of about 23 to 27 inches.

17. A floating wave break apparatus to dissipate wave action in a body of water, the apparatus comprising:
at least two parallel, spaced apart longitudinally extending planar wall members, each comprising a plurality of through holes therein, an upper edge, a lower edges, and first and second opposed side edges, wherein a first one of the wall members that faces incoming waves has the greatest number of through holes, and each successively rearward wall member has fewer through holes than the preceding wall member;
a first end member mounted to the first opposed side edges of the wall members;
a second end member mounted to the second opposed side edges of the wall members;
a flotation member disposed between each adjacent pair of the wall members, each flotation member having an upper surface, a lower surface, and first and second laterally opposed side surfaces, the flotation member lower surface not extending beneath the lower edge of each of the planar wall members;
at least one rigid restraining member secured to the upper edges of the wall members and disposed above the flotation member, the restraining member mechanically interfering with the upper surfaces of the flotation member to restrain upward translation of the flotation member by buoyant forces; and an anchor system comprising at least one winch drum and rope combination, the rope having a first end secured to the winch drum and a second end secured to an anchor at a floor of the body of water.

18. The floating wave break apparatus of claim 17, wherein each successive wall member after the wall member directly facing incoming waves comprises a fewer number of through holes than the previous wall member.

19. The floating wave break apparatus of claim 17, wherein the lower edges of the plurality of parallel, spaced apart wall members extends beneath the lower surface of the flotation member.

20. The floating wave break apparatus of claim 17, wherein the lower edges of the wall members extend downwardly beyond the lower surface of the flotation member.

21. The floating wave break apparatus of claim 17, wherein the first and second side surfaces of the flotation member are spaced apart from each adjacent wall member.

22. The floating wave break apparatus of claim 21, wherein the first and second sides of the flotation member are spaced apart from each adjacent wall member by a distance in the range of about 1 to 3 inches.

23. The floating wave break apparatus of claim 22, wherein wave action water after passing through the plurality of holes in a first wave facing wall member adjacent the flotation member is directed downward beyond the lower surface of the flotation member upon impact with the flotation member thereby dissipating wave action energy.

24. The floating wave break apparatus of claim 23, wherein a portion of the wave action water after descending beyond the lower surface of the flotation member passes into the through holes of a next spaced apart wall member further dissipating wave action energy.

25. The floating wave break apparatus of claim 17, wherein a first longitudinally extending wall member absorbing the initial impact of the wave action comprises the greatest number of through holes of any wall member and each laterally displaced longitudinally extending wall member thereafter comprises fewer through holes for dissipating the wave action energy and incrementally reducing the velocity of the wave action of the body of water as confirmed by computational fluid dynamic modeling.

26. The floating wave break apparatus of claim 17, wherein the wall members comprise through hole diameters in the range of about 7 to 9 inches.

27. The floating wave break apparatus of claim 26, wherein the wall members comprise through holes of approximately 8 inches in diameter.

28. A floating wave break apparatus to dissipate wave action in a body of water, the apparatus comprising:

a first longitudinally extending wall member with a first planar surface an opposed second planar surface, an upper edge, a lower edge and opposed side edges, the first longitudinally extending wall further comprising a plurality of through holes therein;

a second longitudinally extending wall member spaced apart from and parallel to the first longitudinally extending wall member, the second longitudinally extending wall member further comprising a first planar surface, an opposed second planar surface, an upper edge a lower edge and opposed side edges, the second longitudinally extending wall comprising a plurality of through holes therein;

at least one flotation member disposed between the first and second longitudinally extending wall members, the at least one flotation member comprising an upper surface and first and second side surfaces;

at least one restraining member disposed above the at least one flotation member for restraining the flotation member against upward translation, the at least one restraining member secured to the upper edges of the first and second longitudinally extending wall members; and an anchor system comprising a plurality of winch drums and ropes each winch drum mounted to the restraining member by a respective tower, each tower comprising a vertical leg and a canted leg with each leg mounted atop a partial cap, the rope having a first end secured to the corresponding winch drum and a second end secured to an anchor at a floor of the body of water, wherein the tension in each rope is adjustable with its winch drum to restrain movement of the wave break apparatus.

* * * * *